United States Patent [19]
Stalmach, Jr.

[11] 3,785,591
[45] Jan. 15, 1974

[54] COOLING SYSTEM, EMPLOYING HEAT-EXPANDABLE MEANS, FOR AN AERODYNAMICALLY HEATED VEHICLE

[75] Inventor: Charles J. Stalmach, Jr., Grand Prairie, Tex.

[73] Assignee: LTV Aerospace Corporation, Dallas, Tex.

[22] Filed: May 25, 1971

[21] Appl. No.: 146,703

[52] U.S. Cl............ 244/1 SC, 102/105, 244/117 A
[51] Int. Cl............................. B64c 1/40, B64g 1/00
[58] Field of Search................ 244/1, 117 A, 123; 102/105; 60/265; 62/100, 239, 467

[56] References Cited
UNITED STATES PATENTS
3,024,941   3/1962   Vandenberg..................... 244/117 A
3,103,885   9/1963   McLauchlan..................... 244/117 A Primary Examiner—Milton Buchler
Assistant Examiner—Barry L. Kelmachter
Attorney—James M. Cate

[57] ABSTRACT

A cooling system for an aerodynamically heated vehicle includes a chamber disposed within the vehicle and containing a coolant and a heat-expandable means for increasing the pressure and reducing the volume within the chamber upon being heated during aerodynamic heating of the vehicle. Coolant under pressure exerted within the chamber by the expandable means is ejected from the chamber and conducted to the external surface of the heated, external skin of the vehicle. In one embodiment, a plurality of coolant chambers are disposed within a vehicle, each being positioned adjacent a respective portion of the outer skin of the vehicle for providing independent protection of each portion.

13 Claims, 10 Drawing Figures

PATENTED JAN 15 1974 3,785,591

CHARLES J. STALMACH, JR.
INVENTOR

BY James M. Cato
ATTORNEY

CHARLES J. STALMACH, JR.
INVENTOR

BY James M. Cato
ATTORNEY

COOLING SYSTEM, EMPLOYING HEAT-EXPANDABLE MEANS, FOR AN AERODYNAMICALLY HEATED VEHICLE

This invention relates to cooling systems for vehicles subject to aerodynamic heating during high speed, atmospheric flight and, more particularly, to such cooling systems which are operable in response to aerodynamic heating.

In the design of high-speed aircraft and space vehicles, a major limiting factor has been the difficulty of protecting such vehicles from damage or destruction from the effects of frictional and radiational, aerodynamic heating during hypervelocity flight through portions of the atmosphere of the earth or other planets. This so-called "heat barrier" becomes an increasingly serious problem at velocities above Mach 4 or 5 and is a particular problem in the development of shuttle vehicles capable of operation in both a conventional, aerodynamic mode within the atmosphere of the earth and in rocket-powered mode outside the atmosphere. A design requirement for such vehicles is that they be able to, upon entering the atmosphere, to manuever to a landing area by conventional, aerodynamic flight, utilizing wings and aerodynamic control surfaces. These wings and control surfaces must therefore be preserved during reentry to ensure safe operation of the vehicles during relatively low-speed, atmospheric flight. For this reason, the vehicles must be protected against thermal damage of external surfaces or loss of structural integrity. Other examples of vehicles subject to damage from aerodynamic heating include missiles which reenter the atmosphere at very high velocity and are decelerated by pressure and frictional resistance of the atmosphere, the nose portion of such missiles being subjected to intense heating. Additionally, thermal damage is of concern with respect to airplanes designed to fly in the atmosphere at speeds above Mach 3-5 for sustained periods of time, because the deleterious effects of aerodynamic heating may also occur as the temperatures of aircraft components build up over extended periods during flight at such velocities.

In the past, various solutions to the problem have been proposed. The one normally employed for the protection of missiles during reentry is the use of a heat shield which insulates the forward portions of a vehicle from severe heating by partial ablation, reradiation, and absorption. Such an approach does not lend itself to usage in a vehicle also capable of conventional, aerodynamic flight through the atmosphere, however, because any ablation or fusing of external portions of the craft may distort the external configuration of the vehicle and result in a loss of aerodynamic control and an increase in drag. Also, it would be very expensive to refurbish the ablated surfaces after each use during repetitive usage. An approach which has been used at lower velocities is the circulation of a coolant through passageways adjacent the most severely heated portions of an aircraft, such as the nose and the leading edges of the wings, the coolant acting to distribute the heat throughout the craft and thus cause it to be partially disbursed in heat-sink fashion. Such systems are not satisfactory at very high velocities, however, where much greater cooling capacity is required. It is generally proposed to provide the necessary increased cooling capacity by the conduction to a coolant of energy from the severely heated, external surfaces of a vehicle and then the ejection of this coolant from the vehicle through porous, external elements for further cooling the heated portions. Coolant ejected thusly by transpiration through a porous material provides cooling during the evaporation of the coolant and by the formation of a boundary layer of vaporized coolant for shielding the external surfaces from adjacent, superheated, gaseous flow, as will be more fully described hereinbelow. A relatively small amount of fluid for affording a limited degree of evaporative cooling may be suspended immediately adjacent an external wall portion, e.g., within a structure containing a layer of coolant adjacent to the wall portion. Or, a larger amount of coolant may be contained in a chamber within the vehicle and ejected from the vehicle to heated portions of the external skin. Ejection of the coolant may also be accomplished through suitable orifices preferably formed forwardly of respective, heated areas of the skin, or it may be accomplished by transpiration of coolant through a porous element contiguous with a respective heated area of the skin, as indicated above.

Prior-art systems of the type wherein a coolant stored in a tank in a vehicle is caused to flow to a heated, external surface of the vehicle have employed various types of heat sensors and control systems to activate pumps or other pressure sources for causing ejection of the coolant upon the occurrence of deleterious heating. Such control systems, pumps, meters, and the like add undesirable complexity and weight to the cooling system and are subject to possible malfunction or failure under stress. In an alternate approach, coolant contained aboard the vehicle is ejected by pumps or other means actuated in accordance with a predetermined program dependent upon flight time. Such a method is not preferable for most applications, however, in that heating effects may not occur as predicted, and thus, the program may not correspond with actual conditions experienced by the vehicle. Furthermore, such a system also requires the use of fairly complex circuitry and control systems which, again, are subject to failure or malfunction.

It must be recognized that reliable operation of such cooling systems is of critical importance, particularly, of course, when passengers are to be transported in the vehicle. Failure or malfunction of a cooling system, e.g., during an abnormally fast reentry or during heat build-up over an extended period of time, could result in the occurrence of uncorrectable damage to vital elements of a craft and mean the loss of passengers and vehicle alike. It is highly desirable, therefore, to minimize the complexity of such cooling systems and to eliminate components such as pumps, sensors, and hydraulic control systems, etc. which may be subject to malfunction under high-stress conditions. As space travel becomes more routine, it becomes increasingly desirable that space craft be capable of repeated usage rather than single flights only. To achieve this end, effective means for cooling the vehicle upon reentry, which means may be replenished after a flight for repeated usage, is essential.

It is accordingly, a major object of the present invention to provide a new and improved cooling system for a vehicle subject to aerodynamic heating.

Another object is to provide such a system which is operable in response to the rate of aerodynamic heating occurring at a given time.

Another major object is to provide a heat-responsive cooling system of reliable and efficient operation which obviates the necessity of mechanical or electrical control systems, pumps, sensors, and the like.

Yet another object is to provide such a system which may be conveniently and inexpensively refurbished and filled with coolant following use.

Yet another object is to provide such a system which is operable to protect multiple areas of a vehicle which are subject to varying degrees of heating.

A further object is to provide such a system which is of simple construction, and of practicable and inexpensive manufacture.

Other objects and advantages will be apparent from the specification and claims and from the accompanying drawing illustrative of the invention.

Figure 1:
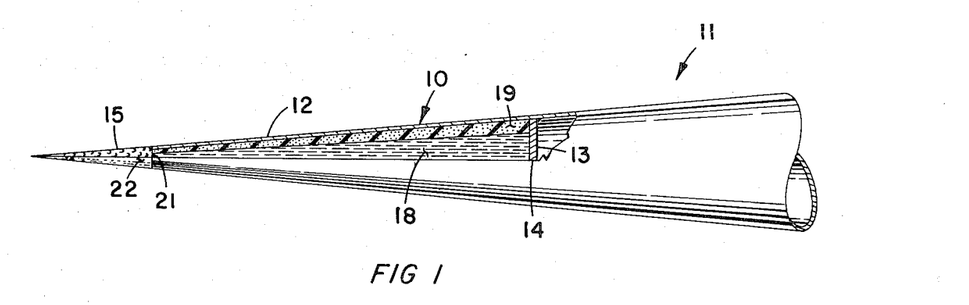
FIG. 1 is a longitudinal, partially sectioned, somewhat diagrammatic view of a missile nose section employing a first embodiment of the cooling system.

With initial reference to FIG. 1, an embodiment of the cooling system 10 is employed in the nose section 11 of a missile adapted to reenter the atmosphere of the earth at high velocity and which is thus subject to intense aerodynamic heating during reentry. The missile nose section 11 is of conical configuration and has an external skin 12 of a material, such as beryllium, chosen for its superior strength and durability when subjected to extremely high temperatures. A frustoconical chamber 13 is defined within the nose section 11 adjacent at least a portion of an area of the skin 12 which area is subject to intense aerodynamic heating; the chamber 13 is preferably at least partially defined by the inner surface of the skin 12. The chamber 13 is also partially defined by a bulkhead 14 ex-tending transversely of the longitudinal axis of the nose section 11 and defining the rear of the chamber 13. The forward portion of the chamber 13 is defined, in the preferred embodiment, by the base of a conical, porous body 15, described more fully below, which constitutes the forward portion of the nose section 11.

As illustrated in FIG. 1, the chamber 13 is partially filled with a coolant 18, the coolant being chosen from materials having good heat conduction and high latent heat of vaporization. Distilled water is a preferred and inexpensive coolant having a latent heat of vaporization of 539.44 gram-calories/gram and which also provides good blockage of heat flow and radiation when ejected into the boundary layer adjacent the nose section 11, as will be more fully described. In addition to liquid coolants such as water, certain normally solid materials are also suitable, provided they have a range of vaporization temperatures below the temperature at which operation of the cooling systems is desired. For example, polytetrafluoroethylene has a vaporization temperature of 867° K and a heat of vaporization of 378 gram calories/gram at atmospheric pressure and thus can be utilized when operation of the system is not necessary at lower temperatures.

Also contained within the chamber 13 is a means for increasing the pressure within the chamber upon being heated by energy produced by aerodynamic heating of the vehicle and comprising a quantity of heat-expandable material 19. The expandable material 19 is a material having a thermal coefficient of expansion substantially greater than that of the coolant 18 and is a material adapted to expand substantially from its original configuration while in a non-vaporized state and at temperatures below those at which the outer skin 12 begins to loose integrity of construction; silicone rubber, for example, is a preferred material because of its high linear coefficient of expansion of approximately $6.7 \times 10^{-4}$ in/in°F. If water is used as the coolant 18, it is desirable that the expandable material 19 be resilient and rubberlike in consistency to permit compression thereof in accomodation of expansion of the coolant 18 in the event of its freezing when the missile or aircraft is exposed to subfreezing temperatures during, for example, high altitude flight and while outside the atmosphere of the earth.

As shown in FIG. 1, the expandable material 19, in its initial or non-expanded configuration, comprises a layer of material seated against the external skin 12 of the nose section 11 and preferably bonded to the inner surface of the skin 12. The expandable material 19 is thus of tapered external configuration, of annular cross-sectional configuration, and constitutes an annular layer of material which partially encloses the coolant 18. In the present embodiment, the expandable material 19 is preferably molded into place by being introduced, in uncured, liquid form, into the chamber 13 as the nose section 11 is spun about its longitudinal axis, thus obtaining an axisymmetrical distribution of the expandable material within the nose section 11 and ensuring consistent bonding of the material to the inner surface of the skin 12.

Figure 4:
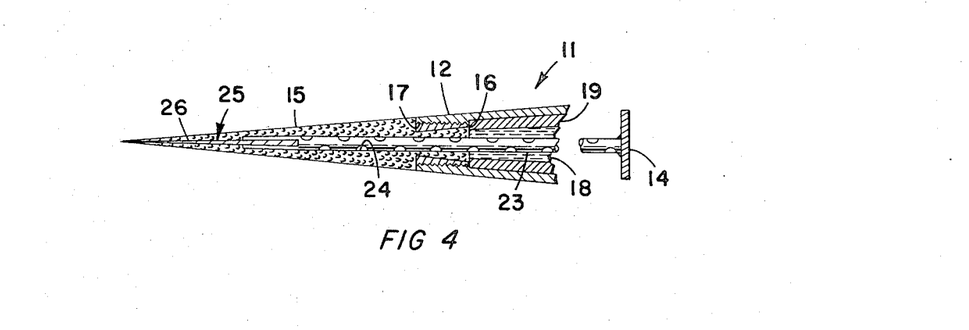
FIG. 4 is a longitudinal, sectional view of the forward portion of the missile nose section showing a modification of the first embodiment of the cooling system.

The conical, porous body 15 is rigidly joined, e.g., suitably welded, to the external skin 12 at the forward portion of the skin. The porous body 15 has an external surface configured to extend contiguously of the external surface of the remainder of the nose section 11. The material of the porous body 15 is one which is not easily deformed at the high temperatures encountered during reentry, and suitable materials include carbon derivatives and boron and stainless steel. A preferred process for its manufacture which is commonly employed in the art in the sintering of particles of a material, such as stainless steel or carbon, together under high temperatures and pressures. When certain, dissimilar metals are used in the construction of the porous body 15 and the skin 12, it may be desirable to provide reinforcement of the juncture, as illustrated in the modification of FIG. 4, because of the difficulty of obtaining a good weld. An externally threaded sleeve 16, of an external diameter less than the internal diameter of the forward portion of the skin 12, is rigidly seated within a corresponding, annular, cutout section formed coaxially of the base of the porous body 15. In the present example, the inner surface of the sleeve 16 tapers inwardly in a forward direction and the sleeve is joined to the porous body 15 by sintering the body in place within the sleeve 16. The forward portion of the skin 12 of the nose section 11 is provided with corresponding internal threads 17 to permit threading engagement of the nose section 11 with the sleeve 16. The nose section 11 may additionally be bolted or pinned (not shown) to the porous body 15.

The porosity of the porous body 15 is determined by the size of the particles and the amount of variation of the sizes of the particles. The porosity should be sufficient to permit seepage through the porous body 15 of a small amount of the coolant 18 in liquid form but to prevent significant passage therethrough of liquid coolant, and to permit passage of the coolant upon its being converted to a vaporized state during aerodynamic heating of the nose section 11. An alternative method of construction of the porous body 15 is to employ a plurality of fine screens formed of filaments of high fusion point materials such as boron or stainless steel, the screens being pressed and bonded or fused together, one upon the other, to provide a desired thickness and porosity. The junction of the porous body 15 and the outer skin 12 thus defines an outlet 21 (FIG. 1) for the chamber 13, and the outlet 21 and the porous body 15 comprise a means for conducting coolant to the external surface of the skin 12 of the nose section 11 by transpiration of the coolant through the porous material. Any coolant conducted through the porous body 15 is thus ejected over the forward portion of the nose section 11 adjacent the leading area of the skin 12, which is the portion subject to the greatest aerodynamic heating.

Figure 3:
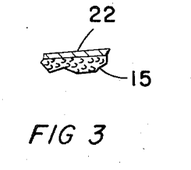
FIG. 3 is a fragmentary, sectional view, on an enlarged scale, of a portion of the porous body of FIG. 1 and showing the external coating.

Means are provided for normally preventing passage of the coolant 18 from the chamber 13 to the external surface of the porous body 15 and of the skin 12; in the present embodiment, a coating 22 (FIG. 3) is deposited over the external surface of the porous body 15, the coating being of a material having a melting point below that at which operation of the cooling system 10 is desired. Solder is a suitable material, as is epoxy resin. The coating 22 seals the external surface of the porous body 15 and serves to prevent seepage or evaporation of the coolant 18 during storage of the nose section 11, but is of a sufficiently low melting point to ensure melting of the coating during heating of the nose section 11 above a predetermined temperature at which operation of the cooling system 10 is desired. Alternatively, a diaphragm or pressure-relief valve (not shown) is installed in series with the outlet 21 for permitting passage of coolant 18 upon pressure within the chamber 13 being raised above a predetermined level during aerodynamic heating of the nose section 11.

In operation, the protective coating 22 prevents passage of coolant through the porous body 15 during storage of the missile and during initial flight of the vehicle at speeds below those at which significant aerodynamic heating occurs. During high-speed flight through the atmosphere or during reentry, greatly increased air pressures occur adjacent the leading portions of the craft, and stagnational and frictional reaction of the airflow with the nose section 11 causes aerodynamic heating of forward portions of the craft. As the temperature of the nose section 11 increases, the temperatures of the skin 12 and the porous body 15 also increase, and substantial heat flux is conducted from the heated exterior portions to the chamber 13 and the heat-expandable material 19 within the chamber. The expandable material 19 and the coolant 18 initially act as a heat sink to absorb and disperse heat from the porous body 15 and skin 12 throughout the remainder of the nose section 11. As the temperature within the chamber 13 continues to rise, the expandable material 19 expands and increases the pressure within the closed chamber 13. Upon the temperature of the coating 22 reaching the melting point, the coating melts and is dispersed by the airflow adjacent the nose section 11, permitting passage of fluid through the porous body 15. In the preferred embodiment wherein water is used as the coolant 18, the temperature reached by the porous body 15 during operation of the cooling system 10 is sufficient to vaporize substantially all the water upon contact or during passage of the coolant through the porous body, thus permitting more rapid ejection of the fluid, in the form of steam, through the porous body 15. Vaporization of the water which occurs within the chamber 13 and porous body 15 provides substantial cooling of the nose section 11 because of the relatively high latent heat of vaporization of water.

Figure 2:
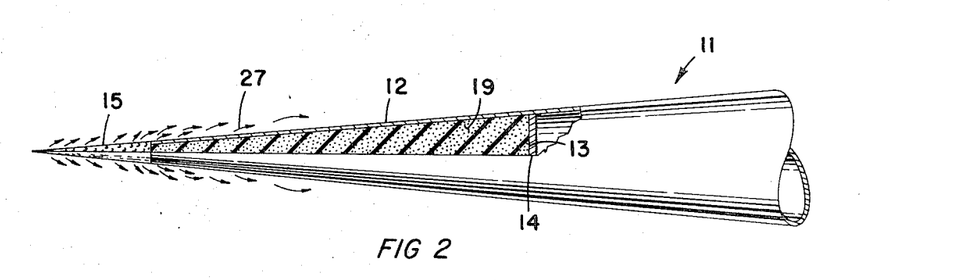
FIG. 2 is a view, similar to FIG. 1, showing the expandable material of the cooling system in an enlarged configuration.

With reference to FIG. 2, the expandable material 19 has expanded inwardly to substantially fill the chamber 13, and the coolant 18 has been substantially dissipated through the porous body 15. The coolant dispersed outwardly through the porous body 15 is swept rearwardly over the porous body 15 and the skin 12 of the nose section 11 in the direction represented by arrows 27, producing a layer of air and vaporized coolant adjacent the skin 12 which acts to cool the skin 12 and to shield it from very hot gasses which are produced around the nose section 11 by radiational and frictional reaction of the forward portion of the nose with the hypervelocity airflow. The cooling system 10 thus utilizes the coolant 18 first as a heat sink to absorb and disperse heat throughout the nose section 11, secondly as an evaporative cooling means, as the coolant is vaporized during its ejection through the heated, porous body 15, and thirdly as a vapor layer, surrounding the skin 12, which protects the nose section 11 by blockage of the super-heated gasses surrounding the nose section 11. The heat-expandable material 19 provides the important advantage, when the system is compared with cooling systems employing evaporation alone to eject the coolant, of increasing the pressure within the chamber and thereby causing ejection of the coolant 18 through the porous body 15 before dangerous heating of the nose section 11 occurs. This occurs because the expandable material 19 begins to expand and exhaust the coolant 18 when exposed to temperatures below those at which significant evaporation pressure occurs, and below temperatures at which dangerous heating of the skin 12 and other portions of the nose section 11 occur. Moreover, the expandable material 19 serves to extend the period of ejection of coolant, and to prevent brief, wasteful surges of pressure and resultant coolant ejection during intense heating, by continuously decreasing the volume available to the coolant as the coolant is evaporated and ejected and thus continuously maintaining increased pressure within the chamber for ejecting the coolant. Absent the expandable material 19, the pressure produced by evaporation of the coolant during heating is initially great, but decreases rapidly as the coolant is ejected and the vapor is permitted to expand throughout the volume remaining in the chamber 13.

With reference to FIG. 4, the modification of the first embodiment includes a length of perforated tube 23 which is tightly fitted within a bore 24 formed coaxially within the porous body 15 from its base and extending forwardly from its base as far as is possible without significantly weakening the forward end of the porous body. The perforated tube 23 extends rearwardly to the rear bulkhead 14 and is suitably supported by being welded or otherwise affixed to the bulkhead. An additional, solid, tapered rod 25, of a material having stability and structural integrity when heated, is tightly fitted within the forward end of the perforated tube 23. The tapered rod 25 extends forwardly from the perforated tube 23 within a corresponding, forwardly tapered cavity 26 also formed coaxially within the porous body 15 and extending substantially to the tip of the porous body. The perforated tube 23 serves to enhance circulation of the coolant 18 from the chamber 13 to the porous body 15 and permits more consistent distribution of the coolant throughout the porous body 15. The presence of the projecting element 25 and perforated tube 23 within the porous body 15 substantially increases the strength of the body 15, and reinforces its attachment to skin 12, to help it resist the stresses of reentry. During the final stages of expansion of the expandable material 19, the perforated tube 23 permits free circulation of coolant 18 from all portions of the chamber 13 and prevents the expandable material 19 from closing upon itself and isolating pockets of unused coolant 18.

Figure 5:
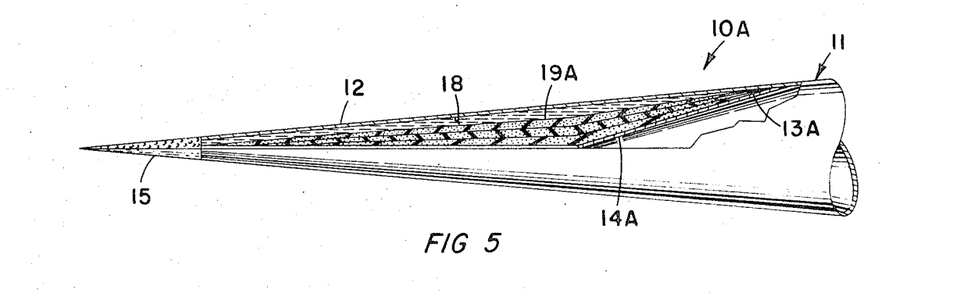
FIG. 5 is a view, similar to FIG. 1, showing a second embodiment of the cooling system.
Figure 6:
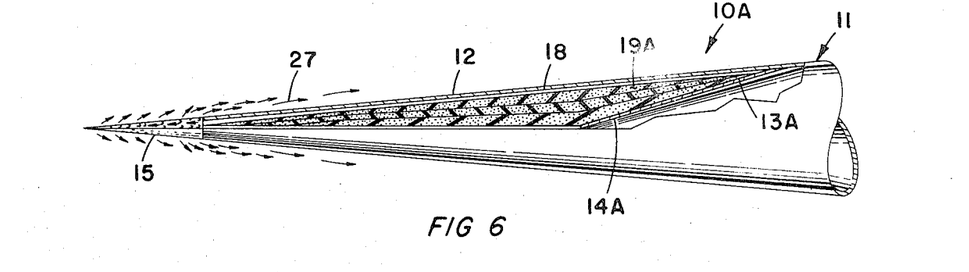
FIG. 6 is a view, similar to FIG. 2, illustrating the second embodiment and showing the expandable material in an enlarged configuration.

With reference to FIG. 5, a second embodiment of the cooling system 10A also employs a heat-expandable structure 19A and a coolant 18 adapted to be ejected through a porous body 15 during aerodynamic heating of the nose section 11, but the expandable structure 19A is disposed centrally of the chamber 13A, and the coolant 18 is disposed externally of the expandable structure 19A and adjacent at least portions of the skin 12 which are subject to aerodynamic heating, i.e., between these portions and the expandable structure 19A. The expandable structure 19A comprises a plurality of sheets of expandable material wrapped one upon the other in annular, concentrai array and disposed coaxially of the longitudinal axis of the nose section 11. This layered construction prevents undesirable stresses within the expandable structure in the event that one portion is heated at a different rate than another portion. Such inconsistent heating may cause uneven expansion of the structure, which could cause sealing off of portions of the chamber 14A when one portion of the expandable material reaches the outer skin 12. The rear bulkhead 14A, modified from the first embodiment, is formed as a cone extending forwardly in and coaxially of the nose section 11 and within the expandable structure 19A. The second embodiment, by containing the coolant 18 adjacent the heat-receiving, external skin 12 rather than within the expandable material 19, provides a faster response to heating of the nose section 11 because the coolant is in contact with the external skin 12, whereas in the first embodiment of FIGS. 1 and 2, the expandable material 19 acts as an insulating media and reduces initial heating of the coolant 18. This may cause a delay in the response of the system when water is used as a coolant and becomes frozen during flight. The second embodiment of FIGS. 5 and 6 is preferred for use in missiles having very high reentry speeds or which experience very rapid heating and thus require a cooling system having almost immediate response. The second embodiment operates similarly to the first embodiment, but differs in that the coolant 18 is in direct contact with the heated skin 12 and is thus heated and evaporated at an earlier stage of the operation of the system, the expandable structure 19A being expanded somewhat later. Initially upon heating, a quantity of coolant adjacent the outer skin 12 is quickly heated to evaporation and ejected by evaporative pressure. As shown in FIG. 6, as the expandable structure 19A is heated, it enlarges outwardly, and coolant is urged forwardly and flows between the expandable material 19A and the outer skin 12 to the porous body 15, where it is ejected as in the first embodiment.

Figure 7:
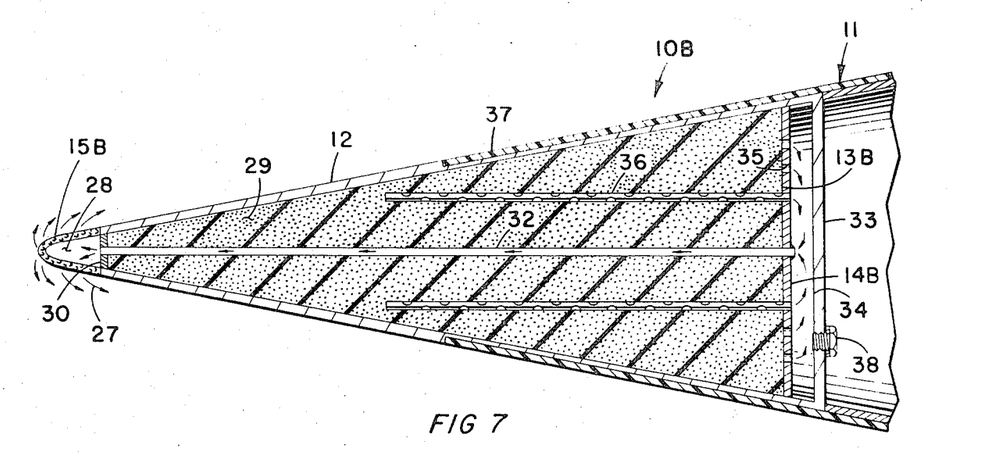
FIG. 7 is a longitudinal, sectional view of a missile nose section containing a third embodiment of the cooling system.

With reference to FIG. 7, a third embodiment 10B of the cooling system is generally preferred for solving the heating problems of vehicles having average reentry velocities. The cooling system 10B is also employed within the nose section 11 of a missile subject to aerodynamic heating. As in the first two embodiments, a coolant chamber 13B is defined within the nose section 11 and contains a coolant and an expandable material. A circular, first or primary bulkhead 14B defines the rear of the chamber 13B as in the first embodiment of FIGS. 1 and 2. In this third embodiment, however, the expandable material is in the form of an open-celled, or substantially open-celled, sponge-like material which is impregnated with coolant, the impregnated, open-celled material being shown at 29. The expandable, open-celled material 29 preferably is foamed, silicone rubber, suitably formed in place by mixing unvulcanized, silicone rubber with a chemical blowing agent, such as N, $N^1$ - dinitrosopentamethylene - tetramine, and heating the mixture at vulcanizing temperature and according to processes known in the art.

At the forward portion of the nose section 11 a conical, porous body 15B is affixed, at its base, to the outer skin 12 and extends forwardly and contiguously therefrom, as in the first two embodiments. In the particular form illustrated in this third embodiment, the porous body 15B is hollowed rather than solid and is formed of porous material of approximately the same thickness as the adjacent outer skin 12. Thus, a cavity 28 of approximately conical configuration is formed within the porous body 15B for collecting vaporized coolant and distributing it evenly through the porous body 15B. A baffle 30, suitably of substantially flat, annular configuration, is mounted within the nose section 11 adjacent and to the rear of the porous body 15B and extends across the nose section perpendicularly of the nose section major axis. The baffle 30 is affixed continuously along its periphery to the outer skin 12 and serves to isolate the cavity 28 from the expandable material 29. An imperforate conduit 32 extends between the baffle 30 and the primary bulkhead 14B and is disposed approximately coaxially of the nose section 11, the conduit extending within corresponding bores formed coaxially through the baffle 30 and the bulkhead 14B and being welded or otherwise rigidly affixed within at least one of the corresponding bores and sealingly fitted within the other. A secondary bulkhead 33 of circular configuration is affixed, at its periphery, to the outer skin 12 at a location spaced rearwardly from the first bulkhead 14B and extends parallel to the first bulkhead and transversely of the nose section 11, thus defining a manifold chamber 34 between the first and secondary bulkheads. The first bulkhead 14B has a plurality of orifices 35 formed therethrough for providing communication between the coolant chamber 13B and the manifold chamber 34. A plurality of perforated tubes 36 are tightly fitted within respective ones of the bores 35 through the primary bulkhead 14B and extend forwardly, within the chamber 13B, for providing improved circulation between the various portions of the chamber 13B and the manifold chamber 34. The exemplary embodiment of FIG. 7 also includes an additional, ablative layer 37 bonded to the exterior of the outer skin 37 within an indented portion of the outer skin 12 which indented portion extends rearwardly from the approximate longitudinal center of the chamber 13B. The ablative, outer layer 37 is of a material such as nylon phenolic head shield material and is employed for providing additional protection from intense heating of portions of the outer skin 12 which are spaced a distance outside the area, adjacent to the porous body 15B, which is most efficiently cooled by the present cooling system 10B, as described below.

An inlet into the chamber 13B is provided for permitting initial injection of coolant, and is suitably formed through the secondary bulkhead 33 and normally closed by a cap 38 threadingly engaged therein.

In operation, the third embodiment 10B (FIG. 7) functions similarly to the first and second embodiments in that heat absorbed by the outer skin 12 and the porous body 15B causes enlargement of the expandable material 29 and evaporation of the coolant. Expansion of the material 29 increases fluid pressure within the chamber 13B, and fluid coolant is caused to flow from and through the open cells of the sponge-like, expandable material 29. However, the coolant, while in liquid form, is prevented from flowing in a forward direction by the baffle 30 and the conduit 32 and is also discouraged from rearward flow by deceleration of the missile during reentry. Upon reaching a vaporized state, the coolant is under increased pressure but is free to flow in a rearward direction only; it is thus passed through the perforated tubes 36 and the orifices 35 and into the manifold chamber 34. From thence the vaporized coolant flows forwardly through the imperforate conduit 32 to the cavity 28 and is then passed through the porous body by transpiration to provide cooling of the external surfaces of the nose section 11 as in the previous embodiments. The baffle 30, manifold chamber 34, and conduit 32, by causing the coolant to recirculate rearwardly in vaporized form before reaching the porous body 15B, prevent wasteful usage of coolant in liquid form caused by sudden deceleration forces during reentry. That is, coolant which is suddenly urged in a relative forward direction within the vehicle by inertial forces during reentry is prevented from being ejected too quickly through the porous body 15B, but rather is retained to first absorb a substantial quantity of heat from the skin 12 until changed to a vaporous state in which it is then circulated through the manifold chamber 34 and conduit 32 at a more uniform rate. Thus, the ejection of coolant is extended over a longer period of time and provides increased thermal protection. The open-celled, expandable material 29 serves to attentuate any undesired periodic movement or "sloshing" of the coolant within the chamber 13B which may tend to affect the stability of the space craft.

Figure 8:
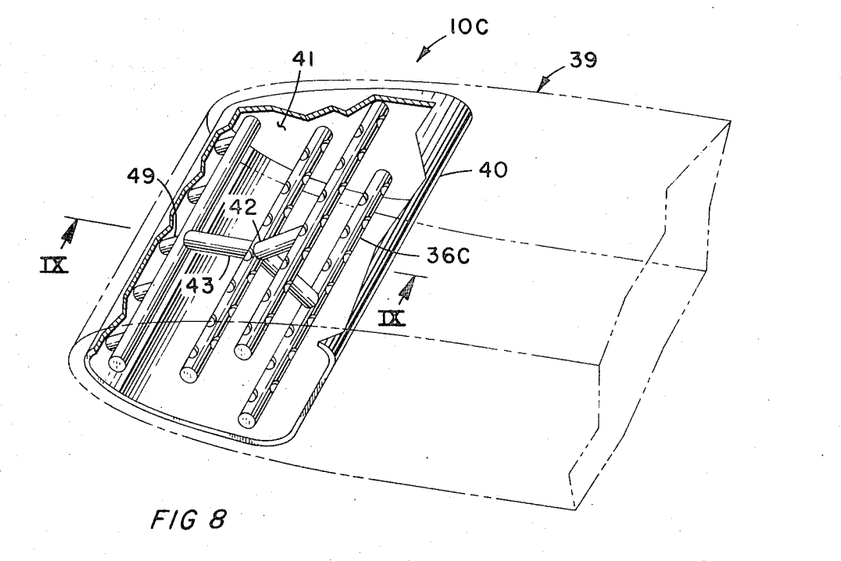
FIG. 8 is an isometric, diagrammatic view of portions of a wing structure employing a modification of the cooling system and with portions of the tank cut away.
Figure 9:
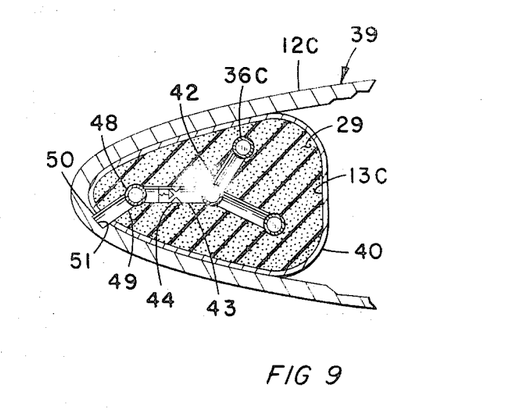
FIG. 9 is a cross-sectional, diagrammatic view of a portion of the structure of FIG. 8.

With reference now to FIG. 8, a modification of the above-described, open-celled embodiment is employed as a cooling system 10C within a seg-ment of a wing 39 of a vehicle such as a space shuttle or space/air vehicle (not shown) used for both aerodynamic flight through the atmosphere and rocket-powered flight beyond the atmosphere. One design concept for such a craft, referred to as a low-cross-range design, requires that the vehicle enter the atmosphere and decelerate rapidly in the upper atmosphere (by reentering at a high angle of attack) to avoid excessive heat buildup and preserve the structural integrity of the craft. It is possible that the vehicle can accomplish reentry without the expenditure of a liquid coolant if high temperature resistant materials are used in the leading edges. However, it is considered necessary that a liquid cooling system be installed and maintained in readiness for use if the vehicle experiences abnormal heating because of reentry at excessive velocity or for other emergency conditions such as spalling of the heatshield. With added reference to FIG. 9, an elongated tank 40 is fitted within the wing 39 and parallel to the leading edge of the wing 39, the tank 40 defining a chamber 13C containing open-celled, expandable material impregnated with coolant, the impregnated, expandable material being represented at 29. The tank 40 is suitably seated against and within the outer skin 12C of the wing 39. A plurality of perforated tubes 36C are contained within the chamber 13C for enhancing circulation of the coolant throughout the expandable material 29, the perforated tubes 36C suitable being affixed to endwalls 41 of the wing segment and extending axially of the tank 40. The perforated tubes 36C communicate with each other through intermediate conduits 42, and with a single, outlet conduit 43. With reference specifically to FIG. 9, a pressure relief valve 44 is mounted within the outlet conduit 43 and is operable for preventing fluid flow through the outlet conduit 43 from the perforated tubes 36C unless a predetermined pressure is applied to the valve 44. The outlet conduit 43 communicates, at its outlet end (i.e., its end opposite the end connected to the perforated tubes 36C) with an imperforate distribution tube 48 which extends parallel to the perforated tubes 36C and adjacent the wing leading edge, shown as the leftward portion of the wing 39 as viewed in FIGS. 8 and 9 of the drawing. A plurality of outlet tubes 49 extend from the distribution tube 48 forwardly toward the leading edge of the wing 39, extend in sealing association with the tank 40 through corresponding openings formed through the tank 40, and are seated within corresponding, annular cavities 50 (FIG. 9) formed within the outer skin 12C. The outlet tubes 49 are mutually spaced along the length of the wing 39. Thin portions 51 of the outer skin 12C extend across the bottoms of the respective cavities 50, and the cavities 50 are sufficiently deep to permit rupture of these thin, remaining portions 51 upon the passage of coolant through the pressure relief valve 44 and conduit 43. Alternatively, replaceable "blowout" plugs (not shown) are tightly fitted within the respective cavities 50. The pressure relief valve 44 acts to normally prevent passage of coolant to the outlet tubes 49. The endwalls 41 of the tank 40 are preferably of a construction thinner and less substantial than the walls of the remaining portion of the tank 40, for reasons which will become apparent from the description to follow. Inlet openings (not shown) are suitable formed in the tank 40 for permitting replenishment of the coolant after use.

In operation, the cooling system 10C of FIGS. 8 and 9 serves as a means for distributing heat from the leading edge of the wing 39 throughout the tank 40 during routine operation of the space/air craft when abnormal heating is not experienced. The external skin 12C dissipates heat by radiation to the external environment. Heat conducted to the coolant-impregnated, expandable material 29 in the tank 40 causes some increase in pressure within the tank 40 as occurs in the third embodiment, of FIG. 7, but the pressure is not sufficient to open the pressure relief valve 44, and coolant is thus prevented from exiting from the tank 40. Upon the occurrence of excessive heating which causes the pressure within the tank 40 to exceed the predetermined level at which the valve 44 opens, however, coolant under high pressure is conducted through the outlet conduit 43, the distribution tube 48, and the outlet tubes 49. The coolant under high pressure within the outlet tubes 49 ruptures the outer skin 12C at the reduced portions 51 across the respective cavities 50, and coolant is ejected through the skin 12C to provide protective cooling of the heated area as in the other embodiments. The pressure within the chamber 13C then decreases somewhat as the chamber is cooled by the coolant. As the coolant pressure in chamber 13C decreases due to the cooling effects of the ejected coolant on the outer skin 12C, the relief valve 44 will begin to close and thus conserve the coolant, i.e., the relief valve 44 also functions as a regulating valve that controls the mass flow of coolant in proportion to the heat load on skin 12C.

While the cooling system 10C, as thus far described, is effective for protecting only one segment of the wing 39, in use a plurality (not shown) of chambers 13C are mounted adjacent one another along the length of the wing 10C, each being adjacent a portion of the leading edge of the wing 39 for providing protection to the respective, adjacent portion of the wing. Each cooling system 10C also includes the heat-expandable, coolant-impregnated material 29 for increasing the pressure within the respective chamber 13C upon being heated by aerodynamic heating of the portion of the leading edge of the wing 39 which is adjacent the respective chamber 13C. Each system 10C includes a respective, pressure relief valve 44 for normally preventing passage of coolant to the adjacent portion of the external surface of the skin 12C and for permitting passage upon the occurrence of excessive, deleterious heating of the respective, adjacent portion of the skin 12C. Thus, should excessive heating occur chiefly adjacent only one of the cooling systems 10C, the tank 40 of that system is first exhausted without wasting coolant from the other systems. Then, if the pressure within the systems adjacent, i.e., on either side of, the exhausted tank 40 has not increased sufficiently to cause opening of the relief valve 44 of the respective adjacent system, pressure in the respective adjacent system is exerted against the respective, common sidewall 41 and ruptures the sidewall, allowing coolant from the adjacent cooling system to flow into the tank 40 of the exhausted system 10C and provide additional coolant for the dangerously heated area of the skin 12C adjacent the exhausted cooling system 10C. Alternatively, pressure relief valves or diaphragms (not shown) may be employed for providing emergency communication between respective, adjacent tanks 40. The perforated tubes 36C of adjacent tank 40 may be open ended, and the tubes of one tank connected with those of the adjacent tanks but separated by a diaphragm or relief valve adapted to open upon exhaustion of coolant from one of the tanks 40, as in the modification of FIG. 10 to be described below.

Figure 10:
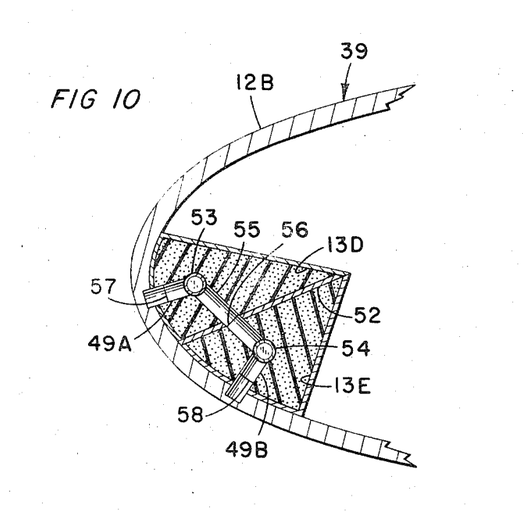
FIG. 10 is a view, similar to FIG. 9, of a modification of the system shown in FIGS. 8 and 9.

With respect now to the modification shown in FIG. 10, the principle of segmented, mutually adjacent tanks is employed with respect to first and second chambers 13D and 13E which are vertically spaced, as well as spaced along the length of the wing 39 as in the modification of FIGS. 8 and 9. A partition 52 separates the two adjacent chambers 13D, 13E. An imperforate, connecting tube 55 extends between and communicates with the perforated tubes 53, 54 of the respective chambers 13D and 13E. The connecting tube 55 extends through a corresponding bore through the partition 52 and is sealingly associated with the partition 52. A diaphragm 56 is extended across the connecting tube 55 for normally preventing fluid flow therethrough. Upon the exhaustion of coolant in either one of the chambers 13D, 13E, the pressure within the exhausted chamber decreases relative to that in the other chamber, and the pressure differential created across the diaphragm 56 causes it to rupture, thus allowing coolant to flow through the connecting tube 55 from the adjacent chamber to partially replenish the exhausted chamber. Outlet tubes 49A and 49B communicate, respectively, with perforated tubes 53 and 54 and operate as do the outlet tubes 49 of the modification of FIGS. 8 and 9 to disperse coolant to the respective, adjacent, potentially severely heated areas of the outer skin 12B. First and second pressure-relief diaphragms 57 and 58 extend across the interior of the first and second outlet conduits 49A, 49B, respectively, to prevent passage of coolant through the respective outlet conduits to the skin 12C until a predetermined chamber pressure is reached and thus function in a manner analogous to the operation of the relief valve 44 (FIG. 9). The modification of FIG. 10 is effective to conduct coolant to a respective, vertically defined portion of the leading edge of the wing 39. The modification of FIG. 10 is operable when one such vertical portion is abnormally heated during reentry at an angle of attack which causes heating of the particular, respective portion, e.g., by increased stagnation occurring at a particular angular section of the leading edge.

With respect to each of the above-described embodiments, it is evident that the cooling system provides operation in direct response to the rate of aerodynamic heating occurring at a given time and thus minimizes any waste of coolant before operation is required. Moreover, the system is of straightforward, relatively simple construction when compared with prior-art devices, and completely eliminates the necessity of pumps, sensors, timing mechanisms, electrical circuits and the like which have been used in analogous prior devices. Reliability of operation is thus improved by the elimination of breakdowns of such mechanisms.

While only a few embodiments of the invention, together with modifications thereof, have been described in detail herein and shown in the accompanying drawing, it will be evident that various further modifications are possible in the arrangement and construction of its components without departing from the scope of the invention.

What is claimed is:

1. Apparatus for cooling a vehicle during high-speed, atmospheric flight, the vehicle having an external skin at least a portion of which is subject to aerodynamic heating, the apparatus comprising:

a chamber defined within the vehicle adjacent a portion of the skin which portion is subject to aerodynamic heating;

a coolant partially filling the chamber;

heat-expandable means, comprising a material also contained within the chamber and expandable while in a non-vaporized state, for expanding, increasing the pressure, and progressively reducing the volume available to the coolant within the chamber upon being heated by energy produced by aerodynamic heating of the vehicle;

means, communicating between the chamber and the external surface of the skin at a leading area of the portion of the skin subject to aerodynamic heating, for conducting coolant to the external surface of the skin upon the pressure within the chamber being increased by the heat-expandable means; and means for normally preventing passage of coolant from the chamber to the external surface of the skin and for permitting passage of coolant to the external surface upon the occurrence of aerodynamic heating of the vehicle above a predetermined level.

2. The apparatus of claim 1, wherein the chamber is at least partially defined by the inner surface of the portion of the skin subject to aerodynamic heating.

3. The apparatus of claim 1, wherein the means for conducting coolant to the external surface of the skin comprises a means for conducting coolant to the external surface of the skin by transpiration of the coolant through a body of porous material.

4. The apparatus of claim 3, wherein the body of porous material has an external surface contiguous with the external surface of the skin, and wherein the means for normally preventing passage of coolant from the chamber to the external surface of the skin and for permitting passage of the coolant upon the occurrence of aerodynamic heating of the vehicle above a predetermined level comprises a coating normally sealing the external surface of the body of porous material, the coating having a melting point below the preselected temperature.

5. The apparatus of claim 3, wherein the vehicle constitutes a missile having a forward nose section, and wherein the body of porous material constitutes the forward portion of the nose of the missile, whereby coolant ejected through the body of porous material during aerodynamic heating of the missile is carried rearwardly adjacent the external surface of the missile by the adjacent airflow for cooling the missile.

6. The apparatus of claim 1, wherein the heat-expandable means comprises a quantity of a heat-expandable material having a coefficient of thermal expansion substantially greater than that of the coolant.

7. The apparatus of claim 6, wherein the heat-expandable material is disposed adjacent portions of the periphery of the chamber and between said portions of the periphery of the chamber and the coolant.

8. The apparatus of claim 6, wherein the coolant is disposed adjacent portions of the periphery of the chamber and between said portions of the periphery of the chamber and the heat-expandable material.

9. The apparatus of claim 6, wherein the heat-expandable material is a resilient, rubberlike material.

10. The apparatus of claim 9, wherein the heat-expandable material is silicone rubber.

11. The apparatus of claim 9, wherein the heat-expandable material is an open-celled, spongelike material which is impregnated with the coolant, the impregnated, heat-expandable material substantially filling the chamber.

12. The apparatus of claim 11, the chamber being provided with an outlet communicating with the means for conducting coolant to the external surface of the skin, the apparatus further comprising at least one perforated tube contained within the chamber and communicating with the chamber outlet.

13. The apparatus of claim 12, wherein the means for conducting coolant to the external surface of the skin comprises a means for conducting coolant to the external surface of the skin by transpiration of the coolant through a body of porous material, and wherein at least one perforated tube is provided in communication with the chamber and extending within the body of porous material.

* * * * *